(12) United States Patent
Dinter

(10) Patent No.: US 9,151,276 B2
(45) Date of Patent: Oct. 6, 2015

(54) GEARBOX FOR INDUSTRIAL APPLICATIONS OR WIND POWER PLANTS

(75) Inventor: Ralf Martin Dinter, Gelsenkirchen (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 14/354,446

(22) PCT Filed: Sep. 6, 2012

(86) PCT No.: PCT/EP2012/067406
§ 371 (c)(1),
(2), (4) Date: Aug. 13, 2014

(87) PCT Pub. No.: WO2013/060518
PCT Pub. Date: May 2, 2013

(65) Prior Publication Data
US 2014/0349815 A1 Nov. 27, 2014

(30) Foreign Application Priority Data
Oct. 27, 2011 (DE) .......................... 10 2011 085 299

(51) Int. Cl.
*F16H 3/74* (2006.01)
*F03D 11/02* (2006.01)
*F16H 1/00* (2006.01)
*F16H 57/01* (2012.01)

(52) U.S. Cl.
CPC *F03D 11/02* (2013.01); *F16H 1/00* (2013.01); *F05B 2260/40311* (2013.01); *F16H 2057/012* (2013.01); *Y02E 10/722* (2013.01); *Y10T 477/675* (2015.01)

(58) Field of Classification Search
None
See application file for complete search history.

(56) References Cited

U.S. PATENT DOCUMENTS

| 4,741,217 A | 5/1988 | Morgan et al. |
| 8,128,525 B2 | 3/2012 | Dinter et al. |
| 8,591,371 B2 | 11/2013 | Dinter et al. |
| 8,632,437 B2 | 1/2014 | Dinter et al. |

(Continued)

FOREIGN PATENT DOCUMENTS

| DE | 3625840 A1 | 2/1988 |
| DE | 38 04 389 A1 | 8/1989 |

(Continued)

OTHER PUBLICATIONS

International Search Report issued by the European Patent Office in International Application PCT/EP2012/067406.

*Primary Examiner* — Dirk Wright
(74) *Attorney, Agent, or Firm* — Henry M. Feiereisen LLC

(57) ABSTRACT

The invention relates to a gearbox having a sensing device (109) for sensing a torque which acts on a drive shaft (101), an output shaft (102) or a shaft which can be driven by the drive shaft (101). The sensing device (109) is electrically connected to an integrated energy-generating device. A rotor (192), which is arranged inside the gearbox housing (103) and connected in a rotationally fixed fashion to a shaft which can be driven by the drive shaft (101), is assigned to the energy-generating device. A bearing (194), which is secured by a housing lid (193), is assigned to this shaft. The housing lid (193) surrounds the rotor (192) in this context. The energy-generating device is assigned a stator (191) which is mounted on the housing lid (193) within the gearbox housing (103).

13 Claims, 5 Drawing Sheets

(56) References Cited

U.S. PATENT DOCUMENTS

Figure 1:
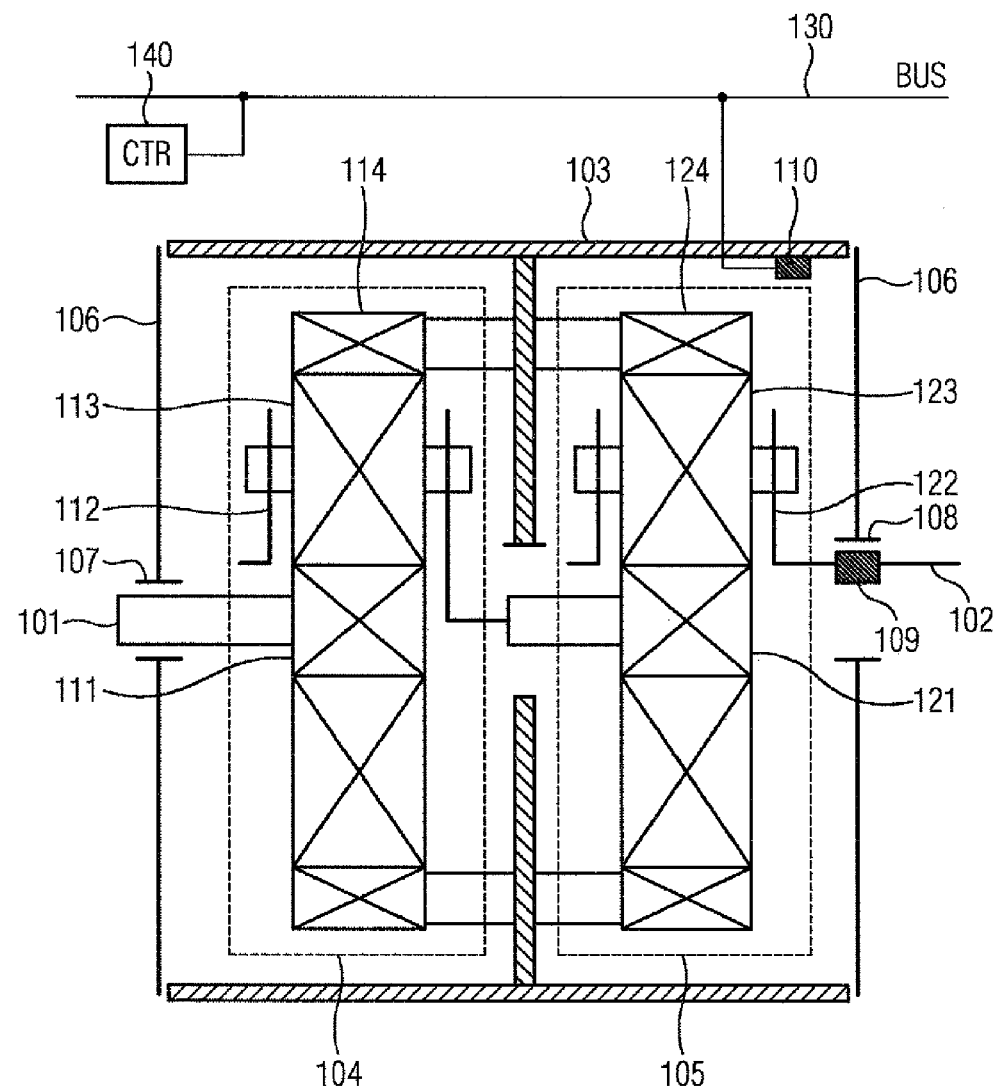

| | | |
|---|---|---|
| 8,757,014 B2 * | 6/2014 | Dinter .................. 73/862.335 |
| 2003/0230151 A1 | 12/2003 | Godler et al. |
| 2012/0125150 A1 | 5/2012 | Dinter |
| 2012/0160037 A1 | 6/2012 | Dinter |
| 2013/0095972 A1 | 4/2013 | Dinter et al. |

FOREIGN PATENT DOCUMENTS

| | | |
|---|---|---|
| DE | 199 62 596 A1 | 7/2001 |
| DE | 103 21 210 A1 | 11/2003 |
| DE | 102009028612 A1 | 2/2011 |
| DE | 102009034832 A1 | 2/2011 |
| DE | 102010017777 A1 | 2/2011 |
| DE | 102009039340 A1 | 3/2011 |
| DE | 102009059669 A1 | 6/2011 |
| EP | 0811764 A1 | 12/1997 |
| GB | 2 385 425 A | 8/2003 |
| WO | WO2011/012497 A1 | 2/2011 |

* cited by examiner

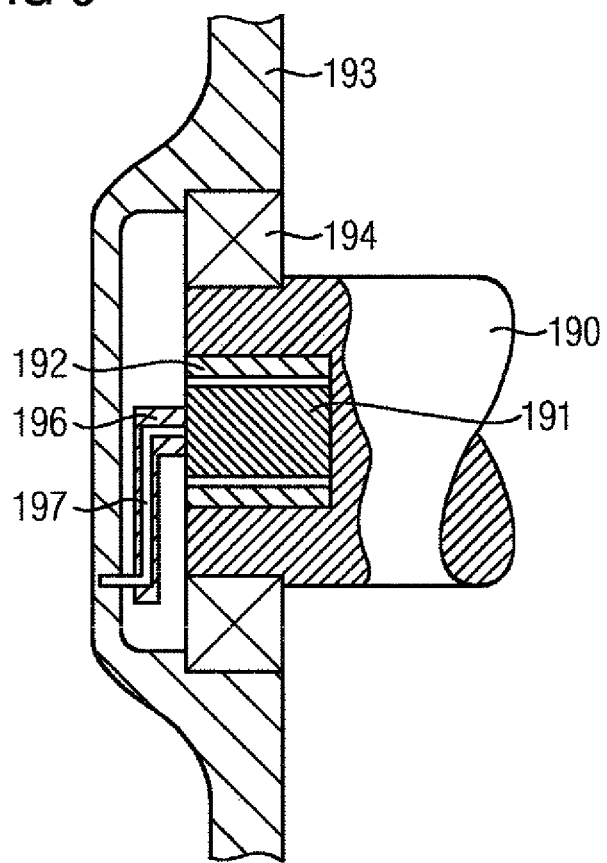
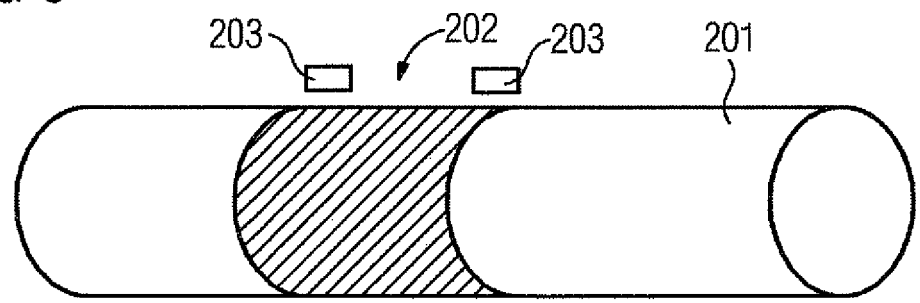

GEARBOX FOR INDUSTRIAL APPLICATIONS OR WIND POWER PLANTS

CROSS-REFERENCES TO RELATED APPLICATIONS

This application is the U.S. National Stage of International Application No. PCT/EP2012/067406, filed Sep. 6, 2012, which designated the United States and has been published as International Publication No WO 2013/060518 and which claims the priority of German Patent Application, Serial No. 102011085299.9, filed Oct. 27, 2011, pursuant to 35 U.S.C. 119(a)-(d).

BACKGROUND OF THE INVENTION

During their service life gearboxes for industrial applications or wind power plants are exposed to a dynamic load sequence of torques and bending moments as well as axial and radial forces. Load spectra defined by users are used to design gearboxes. Actual loads that differ from these load spectra can shorten useful life and interrupt processing, manufacturing or energy generation processes. It is therefore important to detect the loads that actually occur in gearboxes in particular for operation regulation and machine design.

A method for measuring torque in a gearbox with a number of elongation sensors fastened in each instance to a diaphragm of a flexible external gearwheel is known from DE 103 21 210 A1, in which method a gain of output signals from the elongation sensors is increased in each instance before the output signals are combined to form a resulting measurement signal. Adjustment of the gain of the output signals from the elongation sensors allows compensation for rotational ripple contained in the output signals.

GB 2 385 425 A discloses a method for measuring torque in a gearbox, in which a contactless rotation angle sensor is arranged at both ends of a gear shaft and interacts with an assigned detector unit. The detector units here are each mounted on a housing wall or cover. The two detector units are used to derive a phase difference signal, which is a measure of a load-dependent torsion of the gear shaft. A torque acting on the gear shaft is determined from a known torsional stiffness of the gear shaft and the measured torsion.

A measuring device for detecting an overload moment occurring in a gearbox is known from DE 38 04 389 A1, where a measuring device is arranged in the interior of a drive shaft and comprises an optical transmitter, a reflecting mirror and a photoelectric receiver. In the event of overload, the drive shaft bends in such a manner that a reflecting mirror arranged orthogonally to the shaft axis deflects a laser beam emitted by the optical transmitter. The deflected reflection beam produces an electronic signal at the photoelectric receiver, triggering overload protection.

WO 2011/012497 A9 discloses a gearbox, the drive shaft or output shaft of which has a magnetically or optically encoded segment in a region of a housing opening. Its encoding can be changed by an action of a torque or force on the drive shaft or output shaft. A sensing device is used for the contactless detection of the magnetic or optical encoding of the drive shaft or output shaft. The sensing device is arranged in a housing cover enclosing the magnetically or optically encoded segment of the drive shaft or output shaft and is connected electrically to an evaluation device for detecting a load spectrum.

SUMMARY OF THE INVENTION

The object of the present invention is to create a gearbox which allows reliable identification of threatening gearbox overloads.

According to the invention this object is achieved by a gearbox for industrial applications or wind power plants with the features set out in claim 1. Advantageous developments of the present invention are set out in the dependent claims.

The inventive gearbox comprises at least one drive shaft and at least one output shaft, which pass through a respective opening on a gearbox housing. At least one gearwheel connected to the drive shaft and at least one gearwheel connected to the output shaft are also provided, these engaging indirectly or directly with one another. The inventive gearbox also comprises at least one sensing device for detecting a torque acting on the drive shaft, the output shaft or a shaft that can be driven by the drive shaft. The sensing device is connected electrically to an integrated energy-generating device. The energy-generating device is assigned a rotor, which is arranged within the gearbox housing and connected in a rotationally fixed fashion to a shaft that can be driven by the drive shaft. A bearing, which is secured by a housing cover, is assigned to this shaft. The housing cover also encloses the rotor. The energy-generating device is also assigned a stator, which is mounted on the housing cover within the gearbox housing. An air gap is formed between the rotor and the stator in this process. The sensing device is also connected to an evaluation device for detecting a load spectrum. The integration of the energy-generating device for the sensing device into the inventive gearbox results in a higher level of reliability due to the independent energy supply to the sensing device.

BRIEF DESCRIPTION OF THE DRAWING

The present invention is described in more detail below based on an exemplary embodiment with reference to the drawing, in which FIG. 1 shows a schematic view of a first inventive gearbox, FIG. 2 shows a schematic view of a second inventive gearbox, FIG. 3 shows a cross-sectional view of a first variant of an energy-generating device for a torque sensing device integrated into the gearbox according to FIG. 1, FIG. 4 shows a cross-sectional view of a second variant of an integrated energy-generating device, FIG. 5 shows a cross-sectional view of a third variant of an integrated energy-generating device, FIG. 6 shows a perspective view of a shaft segment with magnetic encoding, FIG. 7 shows a perspective view of a sensing device with an excitation coil and a number of measuring coils, FIG. 8 shows a perspective view of a shaft segment with optical encoding, FIG. 9 shows a perspective view of a shaft segment with a number of strain gauges connected in the form of a Wheatstone bridge.

DETAILED DESCRIPTION OF PREFERRED EMBODIMENTS

The gearbox illustrated by way of example in FIG. 1 comprises a drive shaft 101 and an output shaft 102, which are supported in a gearbox housing 103. The drive shaft 101 is connected to a sun wheel 111 of a first planetary stage 104, while the output shaft 102 is connected to a planetary carrier 122 of a second planetary stage 105 which comprises a number of planetary wheels 123. The first planetary stage 104 also comprises a planetary carrier 112, which holds a number of planetary wheels 113 meshing with a fixed hollow wheel 114 and is connected to a sun wheel 121 of the second planetary stage 105. The second planetary stage 105 also has a fixed hollow wheel 124, which meshes with the planetary wheels 123 of the second planetary stage 105.

The end faces of the gearbox housing 103 are each closed by a housing cover 106. The housing covers 106 have holders or guide elements for bearings 107, 108 of the drive shaft 101 and output shaft 102. Provided in the region of the bearing 108 of the output shaft 102 in the present exemplary embodiment is a torque sensor 109, which is connected electrically to an evaluation device 110. Instead of or in addition to a torque sensor it is also possible to provide sensors for detecting speeds, forces, bending moments or positions. According to one preferred embodiment torque measurement values and assigned speed measurement values are detected by the evaluation device 110 as load spectra. A torque sensor could also be provided in the region of the bearing 107 of the drive shaft 101. The torque sensor 109 comprises a magnetically or optically encoded segment of the drive shaft or output shaft as well as a sensing device for contactless detection of the magnetic or optical encoding of the drive shaft or output shaft.

The torque sensor 109 of the gearbox illustrated in FIG. 1 comprises an integrated energy-generating device. According to FIGS. 3 to 5 the energy-generating device is assigned a rotor 192, which is arranged within the gearbox housing 103 and connected in a rotationally fixed fashion to a shaft 190 that can be driven by the drive shaft 101. This shaft can be the output shaft for example and is supported at one end by means of a bearing 194 secured by a housing cover 193. The housing cover 193 encloses the rotor 192 here. The energy-generating device is also assigned a stator 191, which is mounted on the housing cover 193 within the gearbox housing 103. An air gap is formed between the rotor 192 and the stator 191 in this process.

Figure 2:
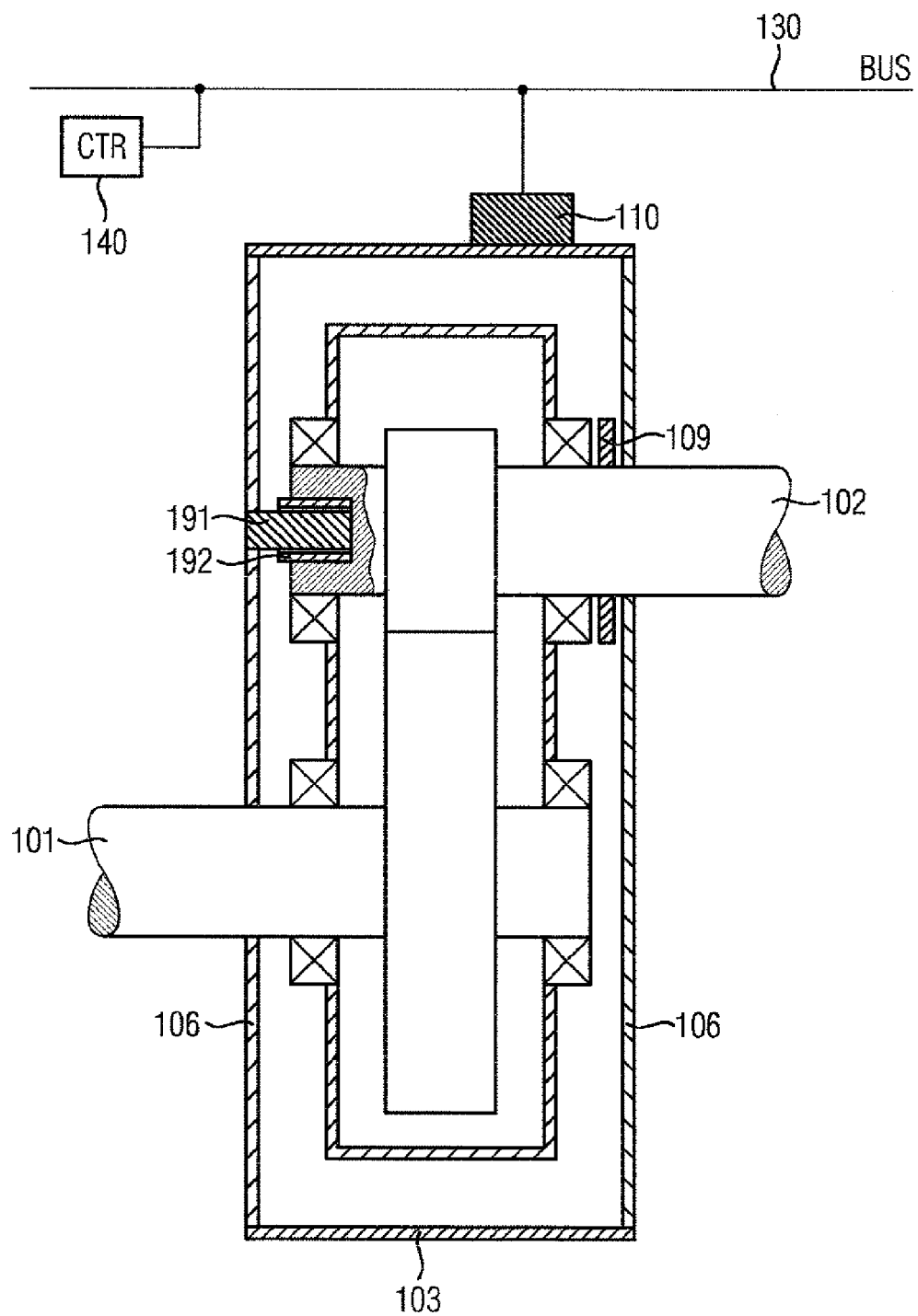

With the gearbox illustrated in FIG. 2 stator 191 and rotor 192 of the energy supply device are arranged so that they are separated spatially from the torque sensor 109. The energy supply device here is fastened to a drive-side housing cover 106, while the torque sensor 109 and an additional speed sensor are mounted on an output-side housing cover 106.

Figure 3:
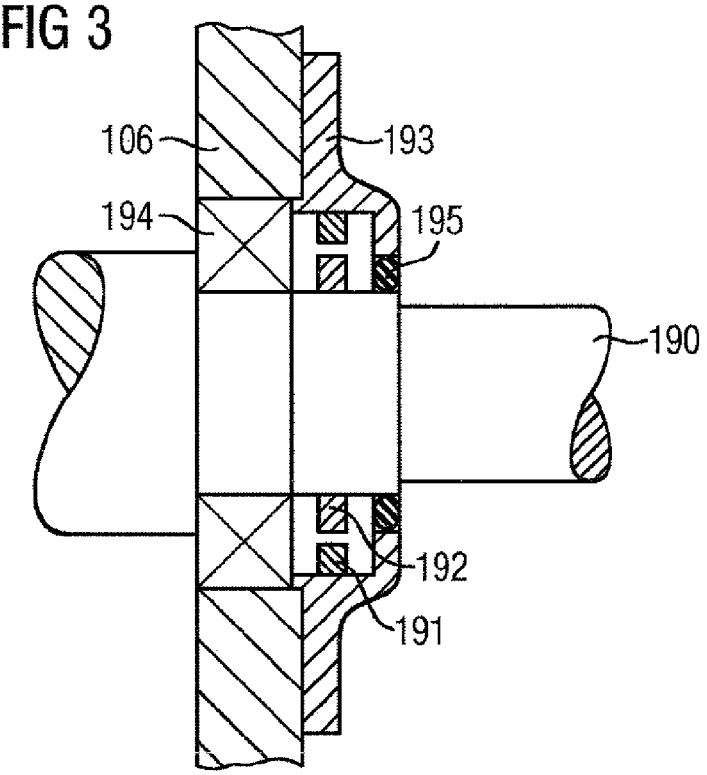

In the first variant of the energy-generating device illustrated in FIG. 3 the housing cover 193 has an opening, through which the shaft, which is connected in a rotationally fixed fashion to the rotor 192, passes. The energy-generating device here is embodied as a permanently energized internal rotor generator with a radially extending air gap and the rotor 192 is positioned on the shaft 190 connected in a rotationally fixed fashion to it and arranged axially between the bearing 194 and a shaft sealing ring 195.

Figure 4:
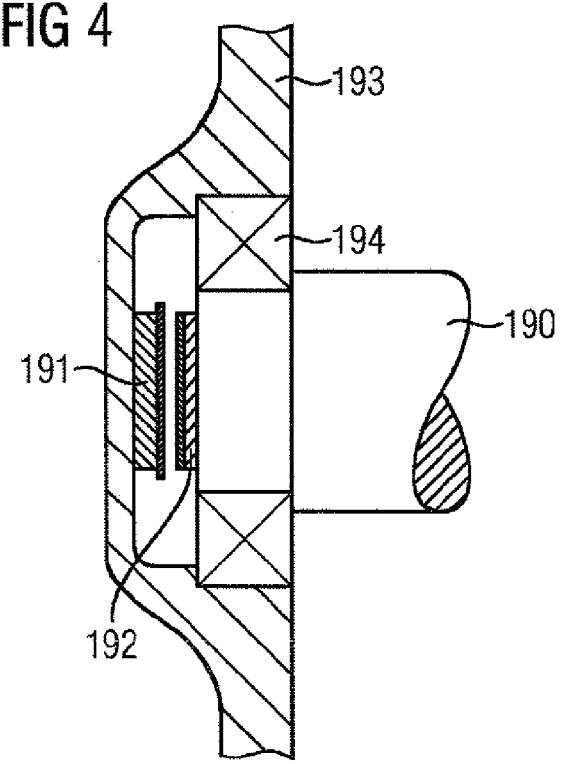

According to the second variant illustrated in FIG. 4 and the third variant illustrated in FIG. 5 the housing cover 193 forms a bearing seat for the bearing 194. In both instances the housing cover 193 is essentially closed and arranged at one end of the shaft 190 connected in a rotationally fixed fashion to the rotor 192. The housing cover 193 also has a bushing for electrical supply lines.

In the second variant illustrated in FIG. 4 the energy-generating device is embodied as a permanently energized generator, the air gap of which extends axially between rotor 192 and stator 191. In contrast the energy-generating device in the third variant illustrated in FIG. 5 is embodied as a permanently energized external rotor generator, the air gap of which extends radially between rotor 192 and stator 191. In principle an internal rotor generator embodiment would also be possible. The energy-generating device is inserted into a hole on the shaft 190 at the housing cover-side end of the shaft 190 connected in a rotationally fixed fashion to the rotor 192 according to FIG. 5. A torque bracket 196 for the stator 191, embodied as an arm, is also mounted on the housing cover 193. The torque bracket 196 here has a bushing 197 for electrical lines.

The evaluation device 110 comprises a storage unit for recording a gearbox load profile. Torque measurement values or force measurement values representing the gearbox load profile and assigned speed measurement values are stored as speed-torque load spectra in the storage unit. The speed-torque load spectra here indicate a temporal portion of a measurement value or measurement value range during gearbox operation. The evaluation device 110 also has a bus interface and according to one advantageous embodiment is connected by way of a bus system 130 to a regulation or control device 140 of a motor driving the gearbox or a generator driven by the gearbox.

Figure 7:
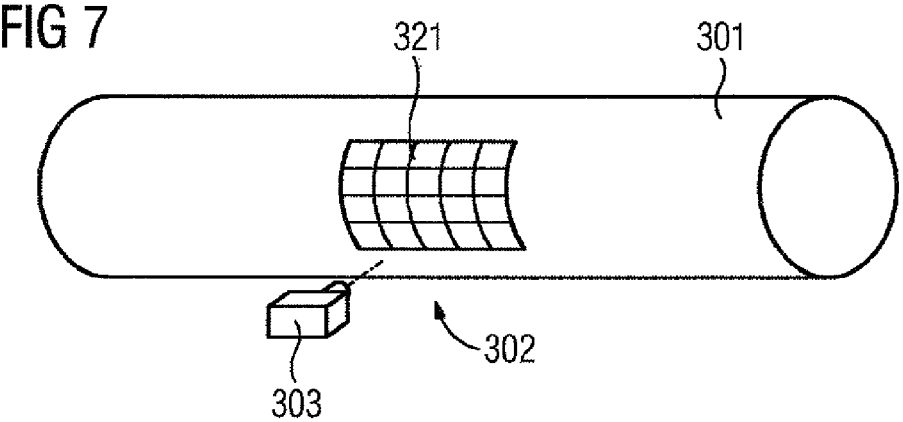

FIGS. 6 and 7 show that the drive shaft or output shaft 201, 301 has a magnetically or optically encoded segment 202, 302 in a region in which it passes through a respective opening on the gearbox housing. Its encoding can be changed by an action of a torque or force on the drive shaft or output shaft 201, 301.

A magnetically encoded segment 202 has a predetermined one-dimensional or multi-dimensional magnetization profile. An overlaid magnetic field resulting from the predetermined magnetization profile here is proportional to a torque acting on the drive shaft or output shaft 201. A sensing device is provided, in a corresponding manner to the magnetically encoded segment 202, which comprises a plurality of magnetic field sensors, for example electrical coils 203.

Figure 8:
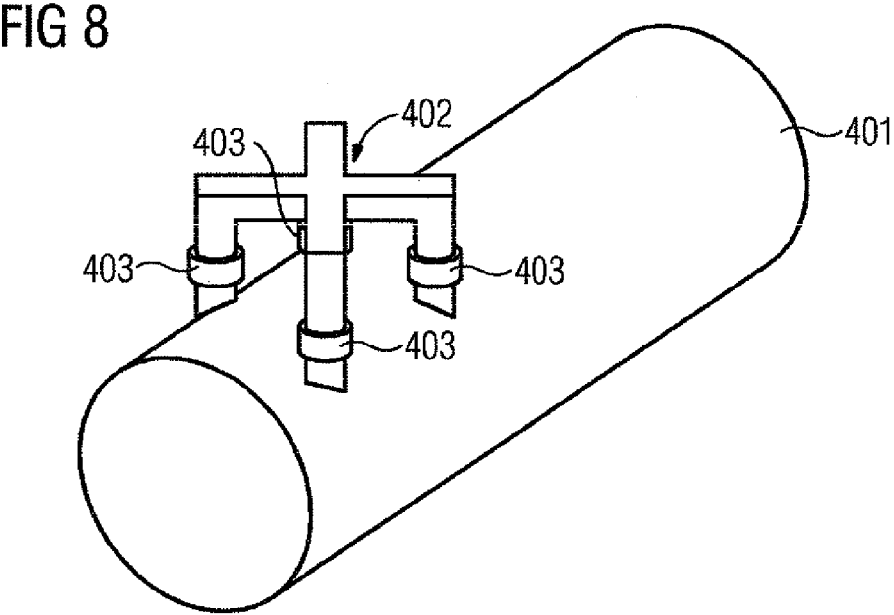

The drive shaft or output shaft can also have a ferromagnetic segment, the permeability of which corresponds to the encoding. According to the view in FIG. 8 the sensing device in this instance comprises a centrally arranged excitation coil 402 for generating a magnetic flux through the ferromagnetic segment of the drive shaft or output shaft 401 and a plurality of measuring coils 403 for detecting a magnetic flux influenced by the permeability of the ferromagnetic segment.

It can be seen from FIG. 7 that an optical strain gauge 321 is arranged in an optically encoded segment 302 of the drive shaft or output shaft 301 with a plurality of reflection points, the distance between which can be changed by an action of a torque or force on the drive shaft or output shaft 301. The sensing device then comprises a light source 302 directed toward the reflection points with integrated light sensor for determining the wavelength of light reflected by the reflection points.

Figure 9:
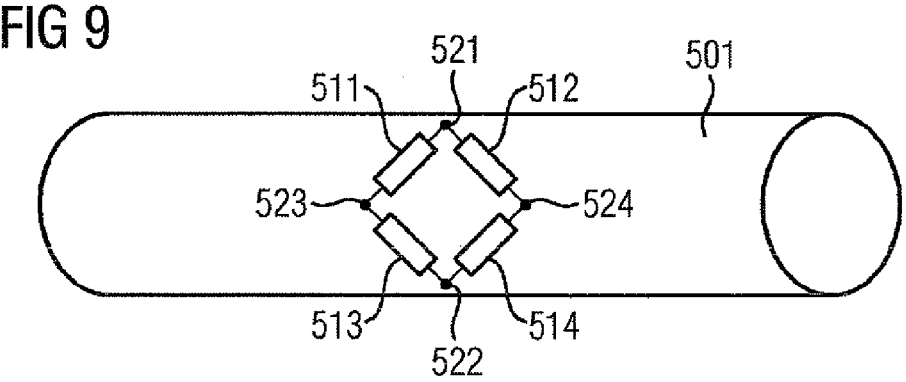

According to the variant illustrated in FIG. 9 a number of strain gauges 511-514 connected to one another in the form of a Wheatstone bridge are arranged on the drive shaft or output shaft 501 in a region in which it passes through a respective opening on the gearbox housing. Torque-dependent torsion of the drive shaft or output shaft 501 brings about a change in a resulting resistance of the Wheatstone bridge. Such a resistance change can be determined by injecting an input voltage between a first 521 and second connector 522 of the Wheatstone bridge and picking up an output voltage between a third 523 and fourth connector 524 of the Wheatstone bridge. If the strain gauges 511-514 are replaced with measuring coils, and an excitation coil is also used, an inductive torque sensor can also be configured based on a Wheatstone bridge.

Energy is preferably supplied to the torque sensor 109 by the energy-generating device described above during operation of the gearbox. A back-up battery is also preferably provided to supply energy when the gearbox is not operating or is operating only at low speed. A standby mode is also provided for both the torque sensor 109 and the evaluation device 110 when the gearbox is driven over quite a long period. As soon as the gearbox is driven again, a trigger signal is generated for example, to reactivate the torque sensor 109 and the evaluation device 110 from standby mode.

Application of the present invention is not limited to the exemplary embodiments described.

What is claimed is:

1. A gearbox for industrial application or a wind power plant, comprising:
   a gearbox housing having a housing cover;
   at least one drive shaft configured to pass through a first opening of the gearbox housing;
   at least one output shaft configured to pass through a second opening of the gearbox housing;
   first and second gearwheels connected to the drive shaft and the output shaft, respectively, and engaging indirectly or directly with one another;
   at least one sensing device configured to detect a torque acting on the drive shaft, the output shaft or a shaft driveable by the drive shaft;
   an energy-generating device connected electrically to the at least one sensing device;
   a rotor operatively connected to the energy-generating device and arranged within the gearbox housing and enclosed by the housing cover, said rotor being connected in fixed rotative engagement to a member, which is in driving relationship with the drive shaft and selected from the group consisting of the output shaft and the shaft driveable by the drive shaft;
   a bearing configured to support the member and secured by the housing cover;
   a stator operatively connected to the energy-generating device and mounted on the housing cover within the gearbox housing, with an air gap being formed between the rotor and the stator; and an evaluation device connected to the at least one sensing device for detecting a load spectrum.

2. The gearbox of claim 1, wherein the housing cover forms a bearing seat for the bearing to support the member connected in fixed rotative engagement to the rotor.

3. The gearbox of claim 1, wherein the housing cover is essentially closed and arranged at one end of the member connected in fixed rotative engagement to the rotor.

4. The gearbox of claim 1, wherein the air gap extends axially between the rotor and the Stator.

5. The gearbox of claim 1, wherein the air gap extends radially between the rotor and the stator.

6. The gearbox of claim 1, wherein the energy-generating device is an internal rotor generator.

7. The gearbox of claim 1, wherein the energy-generating device is an external rotor generator which is inserted into a hole on the member at a housing cover-side end of the member connected in fixed rotative engagement to the rotor.

8. The gearbox of claim 1, further comprising a torque bracket for the stator and embodied as an arm, said torque bracket being mounted on the housing cover and having a bushing for electrical lines.

9. The gearbox of claim 1, wherein the housing cover has an opening through which the member connected in fixed rotative engagement to the rotor passes, said rotor being positioned on the member.

10. The gearbox of claim 1, wherein the air gap extends radially between the rotor and the stator, said energy-generating device being an internal rotor generator.

11. The gearbox of claim 1, wherein the evaluation device comprises a storage unit for recording a gearbox load profile.

12. The gearbox of claim 11, wherein the gearbox load profile is represented by torque measurement values and/or force measurement values which are storable as load spectra in the storage unit to indicate a temporal portion of a measurement value or measurement value range during a gearbox operation.

13. The gearbox of claim 1, wherein the evaluation device is connected to a regulation or control device of a motor driving the gearbox or to a generator driven by the gearbox.

* * * * *